(12) United States Patent
Bachmann (10) Patent No.: US 10,814,574 B2
(45) Date of Patent: Oct. 27, 2020

(54) COMPACTOR FOR BULK MATERIAL

(71) Applicant: ORKEL DEVELOPMENT AS

(72) Inventor: Walter Bachmann, Brutten (CH)

(73) Assignee: Orkel Development AS, Fannrem (NO)

( * ) Notice: Subject to any disclaimer, the term of this patent is extended or adjusted under 35 U.S.C. 154(b) by 373 days.

(21) Appl. No.: 15/746,886

(22) PCT Filed: May 18, 2016

(86) PCT No.: PCT/NO2016/050092
§ 371 (c)(1),
(2) Date: Jan. 23, 2018

(87) PCT Pub. No.: WO2017/023177
PCT Pub. Date: Feb. 9, 2017

(65) Prior Publication Data
US 2020/0079045 A1    Mar. 12, 2020

(30) Foreign Application Priority Data
Jul. 31, 2015 (NO) .................................. 20150983

(51) Int. Cl.
*B30B 9/30* (2006.01)
*A01B 73/00* (2006.01)
*A01F 15/02* (2006.01)

(52) U.S. Cl.
CPC .......... *B30B 9/3042* (2013.01); *A01B 73/005* (2013.01); *A01F 15/02* (2013.01); *B30B 9/301* (2013.01)

(58) Field of Classification Search
CPC ...... A01D 90/00; A01D 90/08; A01D 85/004; A01D 85/005; A01D 46/084;
(Continued)

(56) References Cited

U.S. PATENT DOCUMENTS

| 9,253,947 | B2* | 2/2016 | Hornung | A01D 46/084 |
| 9,622,420 | B2* | 4/2017 | Kraus | A01F 15/0883 |
| 2015/0096450 | A1 | 4/2015 | Hornung | |

FOREIGN PATENT DOCUMENTS

| JP | 2009268422 A | 11/2009 |
| KR | 20120020611 A | 3/2012 |

OTHER PUBLICATIONS

International Search Report and Written Opinion in corresponding PCT Application No. PCT/N02016/050092 dated Aug. 31, 2016.

* cited by examiner

*Primary Examiner* — Debra M Sullivan
*Assistant Examiner* — Matthew Kresse
(74) *Attorney, Agent, or Firm* — Alix, Yale & Ristas, LLP (57) ABSTRACT

Compactor (100) suitable for compacting and wrapping bulk material and suitable for transportation on public roads. The compactor comprises a bunker (200) for reception of the bulk material to be compacted. The bunker (200) exhibits a front end adjacent to a baler unit (300), and a rear end facing the supply of bulk material. The compactor (100) exhibits a longitudinal axis (L) coinciding with the transport direction of the compactor (100) on a road. The bunker (200) comprises two substantially mirror-symmetric foldable first (201A) and second (201B) bunker section mounted to a frame (207) in a pivotal manner in a vertical direction about a horizontal axis extending perpendicularly to the longitudinal axis (L). An end plate (205A; 205B) is mounted pivotal at the rear of the bunker (200) serving as anchoring means and bulk collector means. The first and second bunker sections (201A; 201B) are mounted mutually displaced to the frame (207) to enable one bunker section (201B) to be inserted into the other bunker section (201A) to reduce
(Continued)

width and volume before transport of the compactor (100) on public roads.

6 Claims, 7 Drawing Sheets

(58) Field of Classification Search
CPC . A01D 2085/007; A01B 73/005; A01F 15/00; A01F 15/02; A01F 15/0883; A01F 15/10; B30B 9/301; B30B 9/3042
USPC ...... 414/523; 198/312, 313, 581, 584, 861.2
See application file for complete search history.

COMPACTOR FOR BULK MATERIAL

CROSS-REFERENCE TO RELATED PATENT APPLICATIONS

This application is a U.S. National Phase Application under 35 U.S.C. § 371 of International Patent Application No. PCT/NO2016/050092, filed May 18, 2016, and claims the priority of NO 20150983, filed Jul. 31, 2015, all of which are incorporated by reference in their entireties. The International Application was published on Feb. 9, 2017 as International Publication No. WO 2017/023177 A1.

The present invention is related to a compactor suitable for compressing and wrapping bulk material, as stated in the preamble of claim 1.

BACKGROUND

Compactors of this type are used in production of bales of bulk material, such as forages, sawdust, peat, bark waste products and so on. There are numerous solutions on the market designed for production of round bales or square bales. The compactors are typically mobile units transported by a tractor or truck from one site to another. The compactors are in the compacting process typically driven by a tractor or electric motor. The material to be compacted is transported as bulk material to the compactor site by larger trucks or trailers, often having a loading volume of 40 m³.

A limiting factor for use of compactors of this type is unloading of large trucks or trailers. The reception capacity is often limited because the hopper or bunker part of the compactors has a limited size and capacity because the compactors have to be transported from site to site on the road. In many countries, the maximum road transportation width is 255 cm. This limitation also imposes a limitation on the bunker part of the compactors and hence the capacity. As a result, unloading trucks and trailers become tedious processes both with regard to backing the trailer in an unloading position adjacent to the bunker section. Moreover, the unloading capacity is low and the truck or trailer often has to be parked in an unloading position for a long period of time, usually 30 minutes or more. Loss of material in the unloading process has also been observed.

A compactor is described in the applicant's brochure "Orkel MP/MC Compactors": http://www.orkel.no/assets/Produktinformasjon/MP-MC-brochure.pdf. The compactor is suitable fort road transport and comprises a bunker module, transport devices for bulk material, a compactor module and a wrapper unit.

OBJECT

An object of the present invention is to alleviate the disadvantages of the prior art compactors and provide a compactor having a larger unloading capacity and at the same time is transportable on roads having a transportation width limit. Another object of the present invention is to provide a compactor of this type that reduces spillage and loss of material from the unloading process.

THE INVENTION

The objects above are achieved by a compactor in accordance with claim 1.

The present invention is related to a compactor, suitable for compacting and wrapping bulk material and suitable for transportation on public roads. The compactor comprises a bunker for reception of the bulk material, and conveyor means to convey the bulk material. A baler unit for pressing and wrapping bulk material received from the conveyor means of the bunker. The bunker exhibits a front end adjacent to the baler unit, and a rear end facing the supply of bulk material. Moreover, the compactor (100) exhibits a longitudinal axis L coinciding with the transport direction of the compactor on a road.

In accordance with the present invention, the bunker comprises
a first and second bunker section mounted to a frame in a pivotal manner in a substantially vertical direction about a horizontal axis extending substantially perpendicularly to the longitudinal axis L, wherein the respective bunker section exhibits a side wall extending along the longitudinal axis L, at the outer edge of the bunker section, wherein the first bunker section and second bunker section are mounted mutually displaced in a direction along the longitudinal axis L and in a substantially horizontal direction perpendicular to the longitudinal axis L, and movable in a substantially horizontal direction perpendicular to the longitudinal axis L, to enable one folded bunker section to be moved and inserted at least partly in under the other folded bunker section for transport of the compactor.

An optional end plate is mounted at the rear end of the bunker unit, pivotal about a substantially horizontal axis extending substantially perpendicularly to the longitudinal axis L, pivotal between an unfolded position on the ground and to an erected position extending substantially vertically.

The end plate may advantageously be provided with a side plate which is separate from and mutually movable with the remaining side plate, thus enabling the side plate of the end plate to be pivoted in flush with the remaining side plate.

The frame may comprise a first and second frame part mounted mutually movable in a lateral direction to a common support frame, wherein the first bunker section is mounted to the first frame part, and the second bunker section is mounted to the second frame part.

The novel and inventive features of the present invention enables the bunker to be folded in a transportation mode that because of the reduced width allows transport at normal speed. Moreover, the present invention can increase the compacting capacity of about 30%. Moreover, the end plates reduce spillage of bulk material to a minimum. Another advantage of the present invention is that big trucks unloading as much as 40 m³ can unload the whole load in one operation without having to wait for the compactor to handle the bulk material received and release space for more bulk material still remaining on the truck or trailer.

DRAWINGS

The invention is in the following described in further details by reference to drawings which illustrate one embodiment of the present invention, where.

Figure 1:
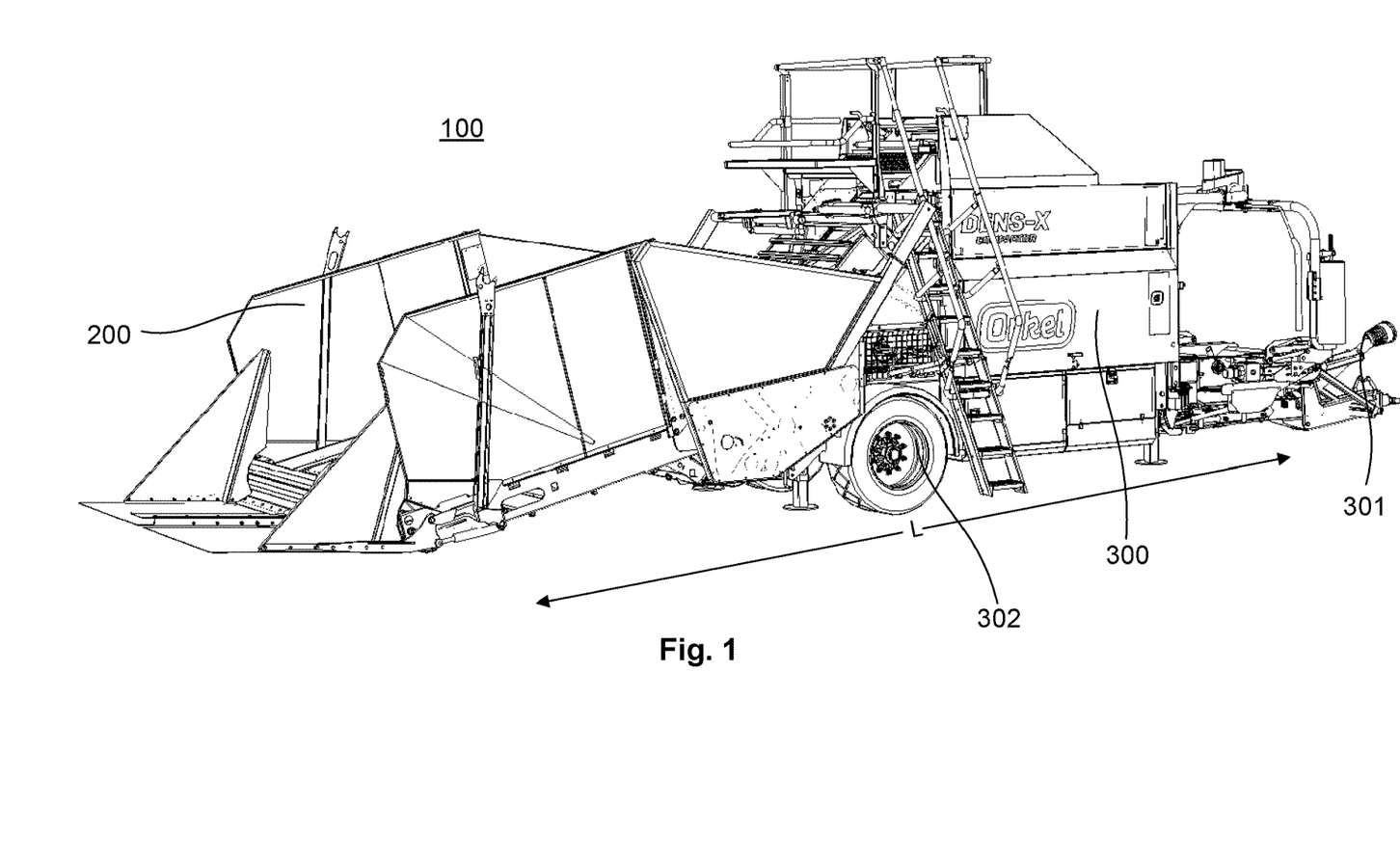
FIG. 1 illustrates a compactor in accordance with the invention in perspective viewed from a rear side.

Now referring to FIG. 1, a compactor device is shown, indicated generally at 100. The compactor 100 generally comprises a bunker 200 and a baler unit 300. The bunker 200 serves as a reception and conveyor unit to receive and convey material to be compacted in the baler unit. The baler unit 300 comprises a compressing device and a wrapping device and typically a tow bar 301. Wheels are indicated at reference numeral 302. The baler unit 300 is known from the prior art and is therefore not described in further details here. The longitudinal axis of the compactor 100 is indicated by the arrow having reference character L. This axis is also the direction of transportation of the compactor 100, e.g. on a public road and the conveying direction of the material to be compacted.

In the following, a description of a folding process to prepare the compactor for transport is provided with reference to FIG. 2-7 which illustrates the consecutive steps of the folding process.

Figure 2:
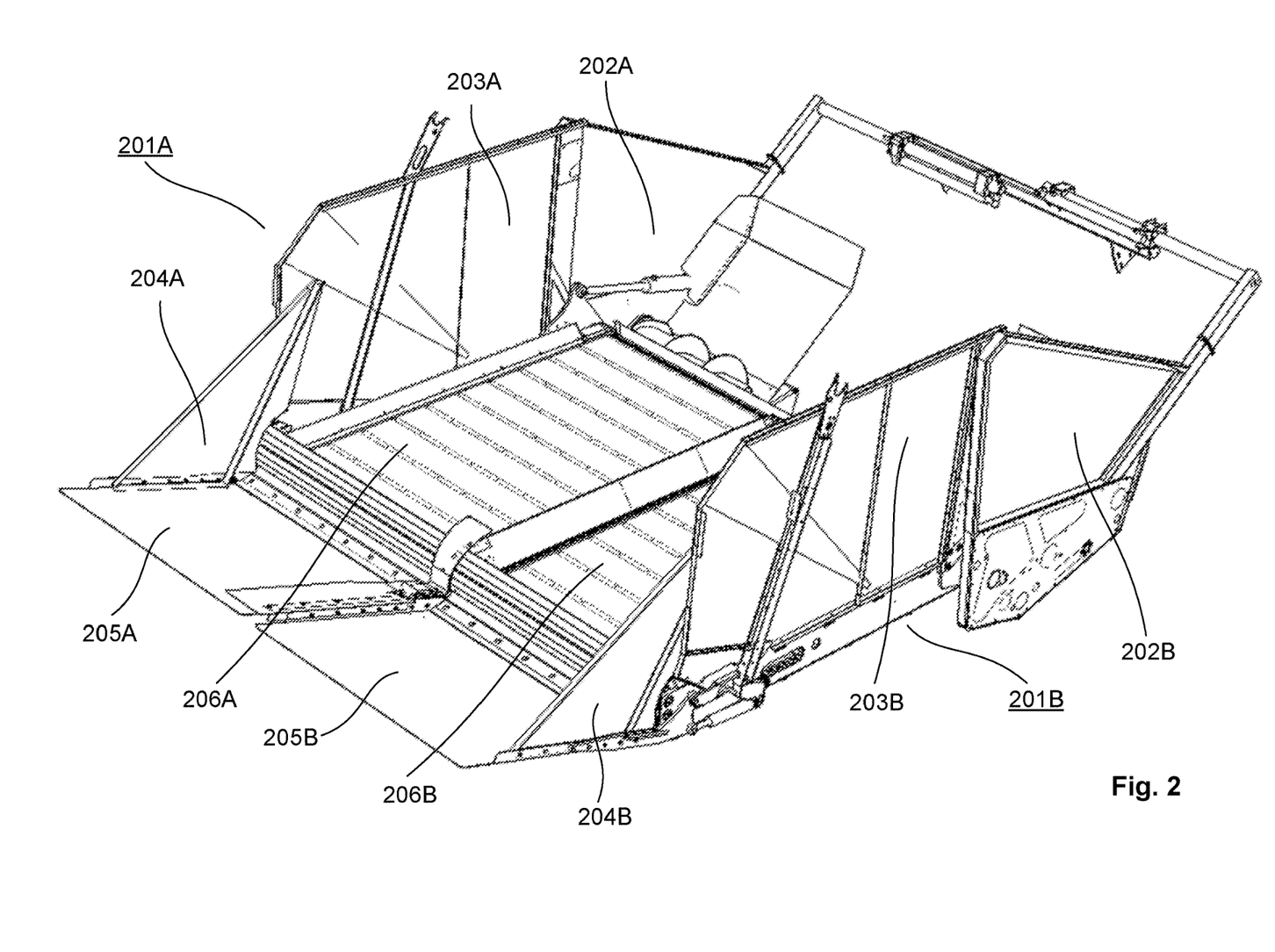
FIG. 2 is a drawing similar to FIG. 1 but where the compacting unit has been omitted for clarity, illustrating the bunker module in an operative position.
Figure 3:
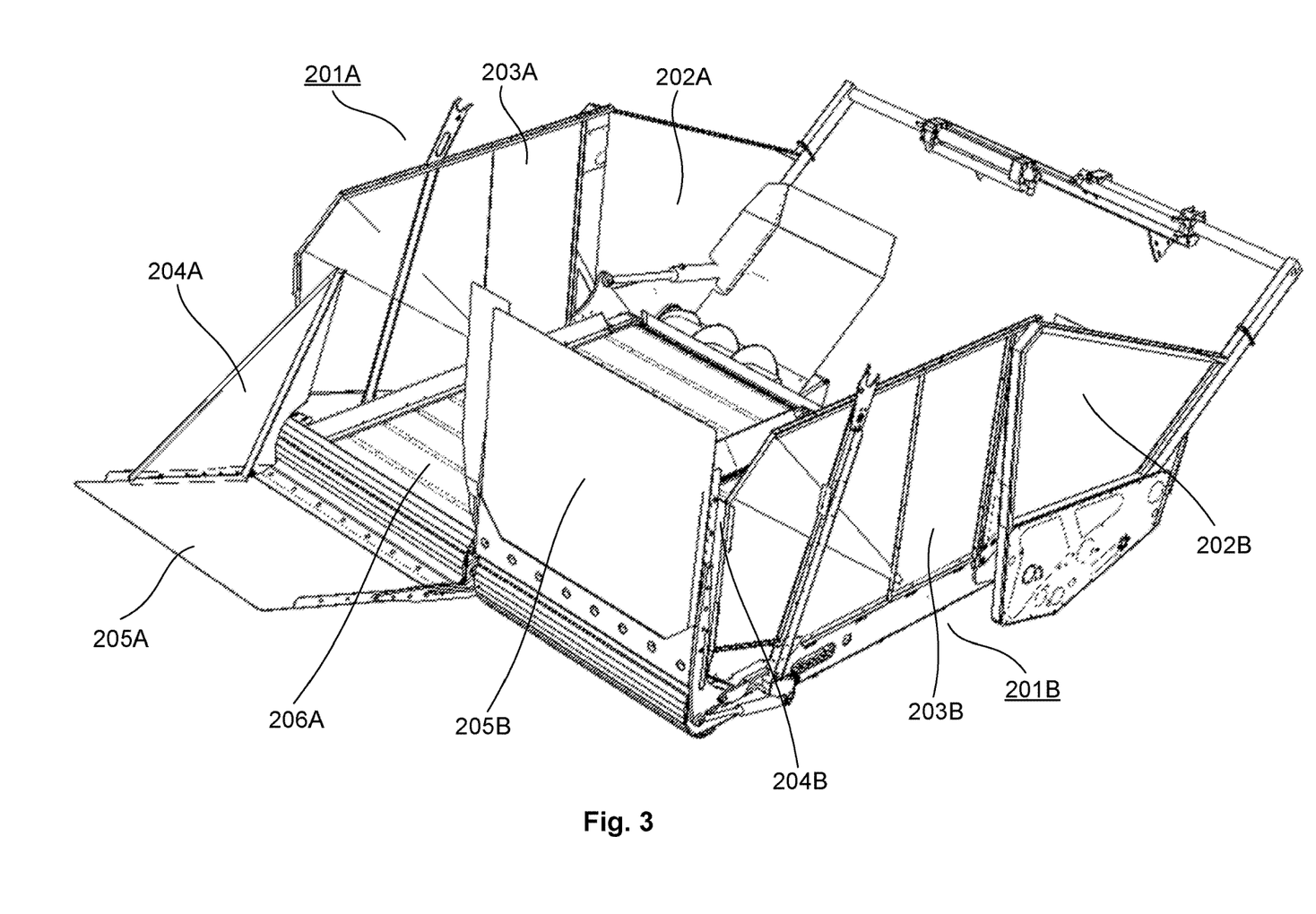
FIG. 3 is a drawing similar to FIG. 2 but where the end plate of the second bunker section has been folded upward in a folding process.

Now referring to FIG. 2, the bunker 200 comprises a first and second bunker unit 201A and 201B, respectively. The respective bunker units are formed substantially mirror symmetric about the longitudinal axis L. Therefore, the structure of only one of the sections is described in the following. The respective bunker units comprises a side plate 202A, 203A, 204A serving as a barrier to material to be compacted and prevent the same from being lost during reception and transport. The first bunker unit 201A further comprises a conveyor 206A arranged to convey received material into the baler unit for compacting and wrapping. The bunker unit is preferably provided with a foldable end plate 205A, foldable between a horizontal position (as illustrated in FIG. 2) to an erected position (for example as illustrated in FIG. 3). In the horizontal position the end plate 205A serves as a anchoring part as the truck or trailer may park its wheels upon the plate. Another advantage of the foldable end plate 205A is that it captures bulk material which is left after the conveying step and feeding it upon the conveyor 206A and further into the baler unit. Yet another advantage of the foldable plate 205A is reduced transportation volume in a folded position as described in further details below. The end plate 205A is preferably driven between its respective positions by a hydraulic or electric drive means.

Now referring to FIG. 3, the end plate 205B of the second has been folded upward to an erected position in a process of preparing the compactor for transport. Moreover, the side plate comprises three separate side plate sections 202A, 203A and 204A arranged substantially vertically and mutually foldable upwards and downwards one into another. In FIG. 3 the side plate section 204B of the end plate has been pivoted and folded into the inner side of the side plate section 203B facing the conveyor 206B (hidden in this figure).

Figure 4:
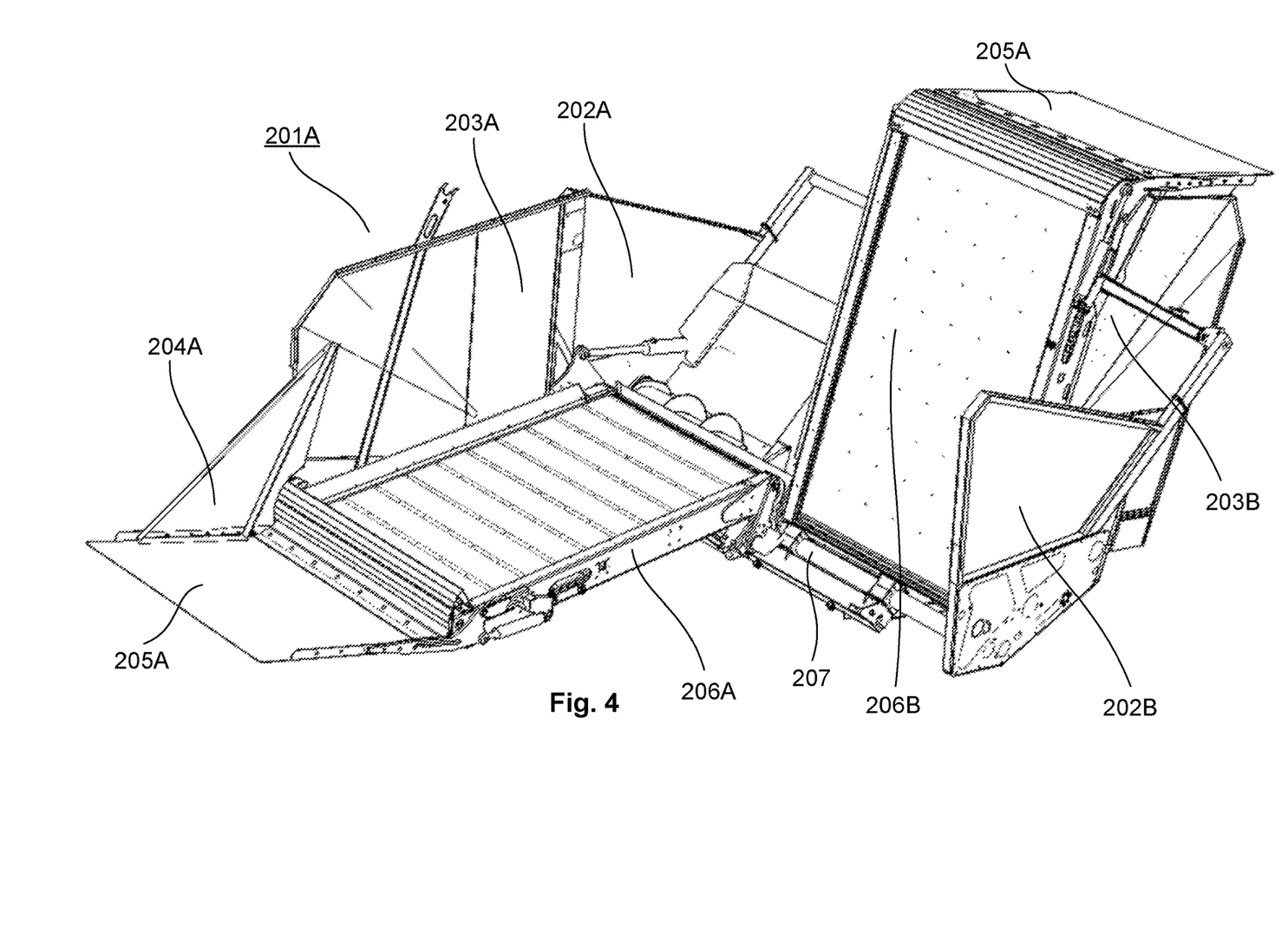
FIG. 4 is a drawing similar to FIGS. 2 and 3, but where the bunker bottom including a conveyor and its end plate of the second bunker section has been erected in a folding process.

FIG. 4 illustrates the next step of the folding process. Here, the conveyor 206B has been erected with its belt extending substantially in a vertical plane, including its accompanying end plate 205B parked in a substantially horizontal level. A main frame is indicated at reference numeral 207 to which the conveyors 206A and 206B are arranged in a pivotal manner about an axis extending substantially horizontally and substantially perpendicularly to the longitudinal axis L.

Figure 5:
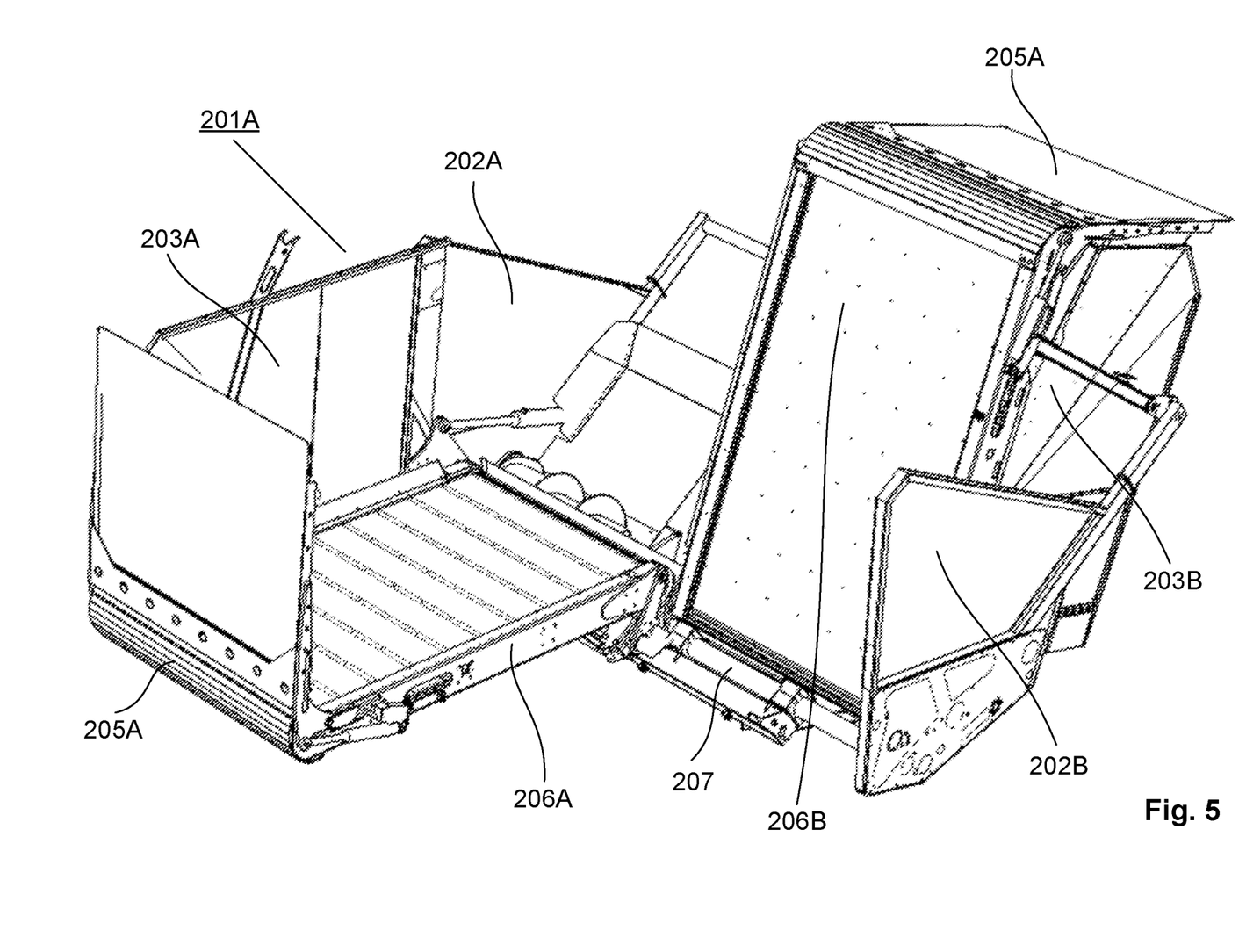
FIG. 5 is a drawing similar to FIG. 2-4, where the end plate of the first bunker section has been erected in a folding process as illustrated in FIG. 3 for the second bunker section.

In FIG. 5, the folding process of the first bunker section 201A has started, where its end plate 205A has been erected into an upright position. This is a step similar to the step of the process of the second bunker unit 201B illustrated in FIG. 3.

Figure 6:
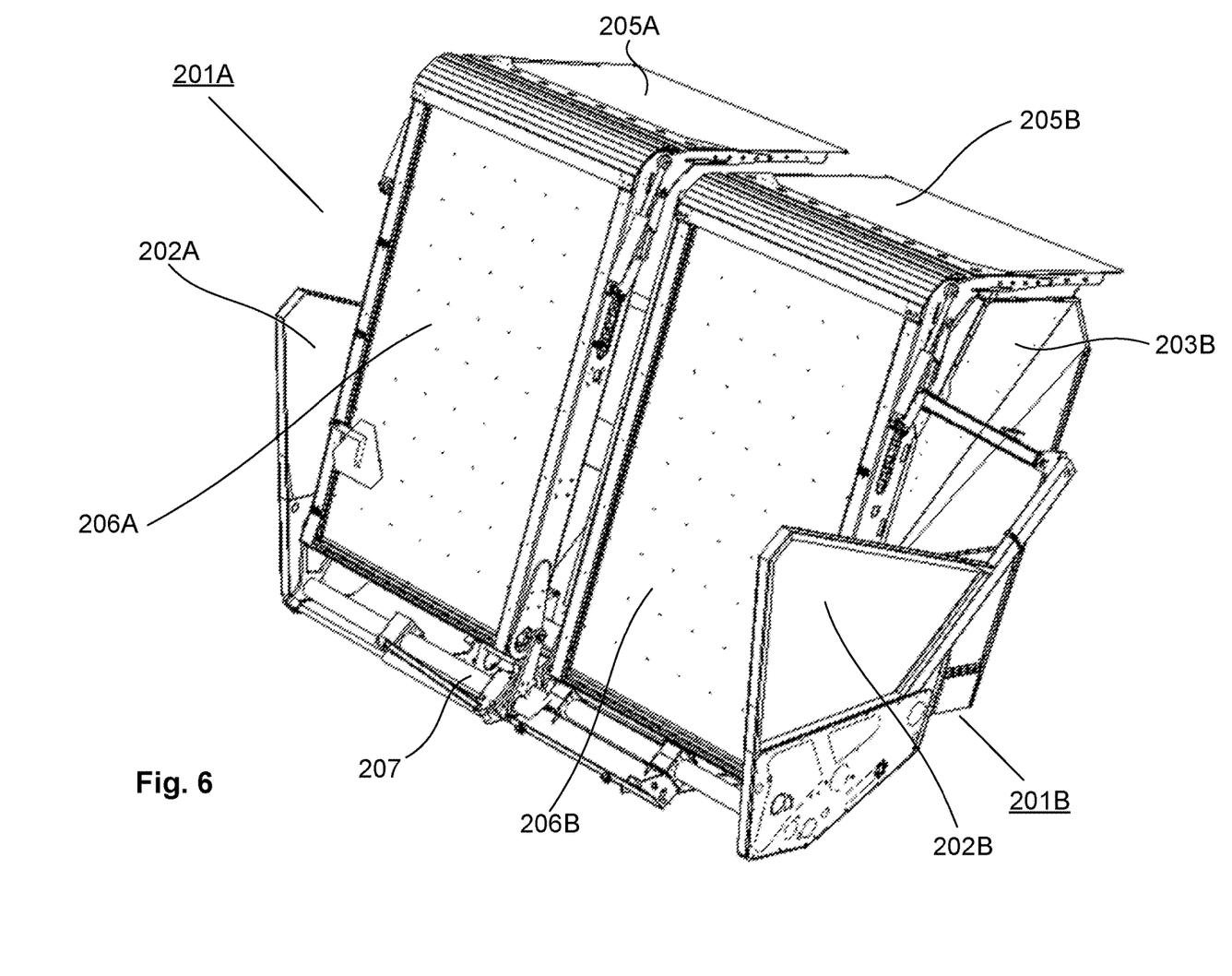
FIG. 6 is a drawing similar to FIG. 2-5 where also the first bunker section including its end plate has been erected in a folding process, similar to FIG. 4.

In FIG. 6, the conveyor 206A also has been pivoted and erected into a substantially vertical position with regard to its conveyor belt. This is a step of the folding process which is similar to the one for the second bunker section 201B illustrated in FIG. 4. As is evident from FIG. 6, the first and second bunker sections 201A and 201B, including their respective end plates 205A, 205B, conveyors 206A, 206B, as well as side plates 202A, 203A, 204A and 202B, 203B, 204B, are mounted mutually displaced to the main frame 207 both in a vertical direction and in a horizontal direction viewed when the compactor is in an unfolded position ready for compacting bulk material. Moreover, the first and second bunker section 201A and 201B are, as described above, mounted pivotally to the main frame 207, but are also mutually movable in a direction perpendicular to the longitudinal axis L of the compactor 100, to enable one bunker section 201B to be positioned in under the other bunker section 201A. This step is illustrated in FIG. 7.

Figure 7:
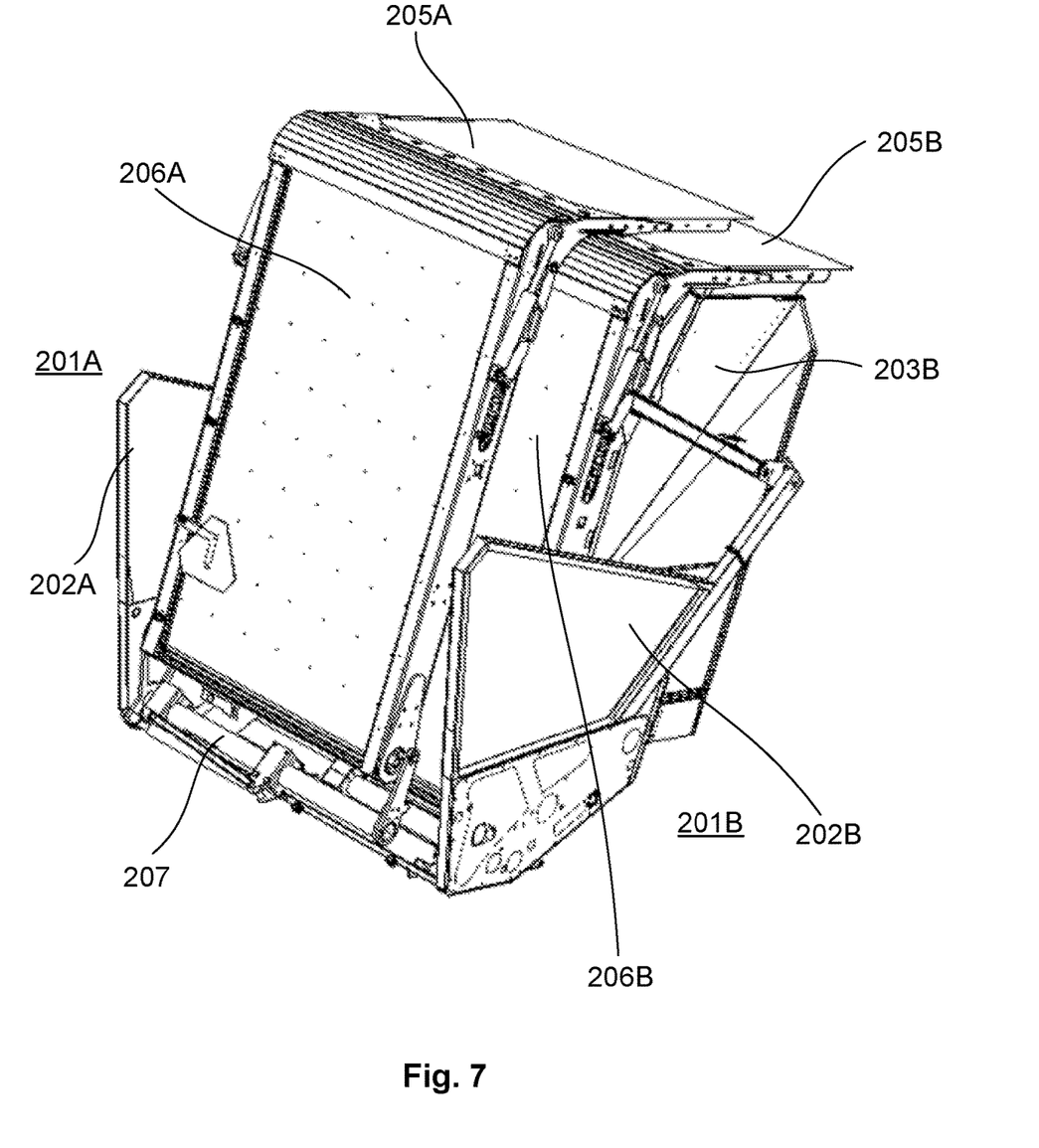
FIG. 7 is a drawing similar to FIG. 2-6 where the second bunker section has been inserted under the first bunker section, ready for transport.

In FIG. 7, the second folded bunker section 201B has been inserted in under the first folded bunker section 201A, thus decreasing the total width of the bunker 200 of about 50%. Accordingly, the volume of the bunker 200 has been drastically reduced, and the width of the bunker 200 has been reduced to enable normal unattended transport at high speed on public roads.

The respective bunker sections 201A and 201B including their accompanying components, can be mounted to the main frame 207 in numerous ways. For example, the main frame 207 may be constructed or two frame parts, movable in a lateral direction viewed in the transport direction of the compactor, and connected to a common support frame. Moreover, the movable parts of the bunker as described above can be driven in numerous ways. The end plates 205A and 205B may be operated manually. The conveyors may also be pivoted manually. However, in a preferred embodiment, the pivotal or movable parts of the bunker are driven mechanically, e.g. powered by electricity or pneumatically. The details of the frame and mechanical drive means have been omitted here as it is assumed that an operative result is within the reach of a person skilled in the art having the present disclosure in hand. Moreover, whereas the conveyors (206A, 206B) has been exemplified as belt conveyors, this is not required to obtain the desired effects of the invention and other bulk conveying means are conceivable and within the reach of a person skilled in the art.

The invention claimed is:

1. Compactor (100), suitable for compacting and wrapping bulk material and suitable for transportation on public roads,
   said compactor comprising a bunker (200) for reception of the bulk material, said bunker comprising a conveyor (206) arranged to convey the bulk material, a baler (300) configured for pressing and wrapping the bulk material received from the conveyor (206) of the bunker (200), said bunker (200) exhibiting a front end adjacent to the baler (300), and a rear end facing a supply of the bulk material, said compactor (100) having a longitudinal axis (L) coinciding with a transport direction of the compactor (100) on a road, wherein the bunker (200) comprises a first (201A) and second (201B) bunker section mounted to a frame (207) in a pivotal manner in a substantially vertical direction about a horizontal axis extending substantially perpendicularly to the longitudinal axis (L), wherein a respective one of the first bunker section and the second bunker section exhibits a side plate (202A, 203A; 202B, 203B) extending along the longitudinal axis (L), at an outer edge of the respective bunker section, wherein the first bunker section (201A) and second bunker section (201B) are mounted mutually displaced in a direction along the longitudinal axis (L) and in a substantially horizontal direction perpendicular to the longitudinal axis (L), and movable in a substantially horizontal direction perpendicular to the longitudinal axis (L), to enable a folded configuration of the second bunker section (201B) such that the second bunker section (201B) is configured to be moved and inserted at least partly in under a folded configuration of the first bunker section (201A) for transport of the compactor (100).

2. The compactor of claim 1, wherein an end plate (205A; 205B) is mounted at the rear end of the bunker (201A; 201B), pivotal about a substantially horizontal axis extending substantially perpendicular to the longitudinal axis (L), pivotal between an unfolded position on the ground and to an erected position extending substantially vertically.

3. The compactor of claim 2, wherein the end plate (205A; 205B) is provided with a side plate section (204A; 204B) which is separate from and mutually movable with the side plate (202A, 203A; 202B, 203B), thus enabling the side plate section (204A; 204B) of the end plate (205A; 205B) to be pivoted in flush with the side plates (202A, 203A; 202B, 203B).

4. The compactor of claim 1, wherein the frame (207) comprises a first and second frame part mounted mutually movable in a lateral direction, viewed in the transport direction of the compactor, to a common support frame, wherein the first bunker section (201A) is mounted to the first frame part, and the second bunker section (201B) is mounted to the second frame part.

5. A compactor comprising:

a bunker configured to receive bulk material, wherein the bunker comprises a front end, a rear end, and a conveyor, wherein the conveyor is configured to convey the bulk material; and a baler adjacent the front end of the bunker, wherein the baler is configured to press and wrap the bulk material received from the conveyor;

wherein the compactor comprises a longitudinal axis coinciding with a transport direction of the compactor; wherein the bunker further comprises first and second bunker sections pivotably mounted to a frame about a horizontal axis extending substantially perpendicularly to the longitudinal axis, wherein the first and second bunker sections are configured to be movable in a substantially horizontal direction perpendicular to the longitudinal axis, and wherein the first and second bunker sections are configured to be movable to folded configurations.

6. A compactor comprising:

a bunker configured to receive bulk material, wherein the bunker comprises a front end, a rear end, and a conveyor, wherein the conveyor is configured to convey the bulk material; and a baler adjacent the front end of the bunker, wherein the baler is configured to press and wrap the bulk material received from the conveyor;

wherein the compactor comprises a longitudinal axis coinciding with a transport direction of the compactor; wherein the bunker further comprises first and second bunker sections pivotably mounted to a frame about a horizontal axis extending substantially perpendicularly to the longitudinal axis, wherein the first and second bunker sections are configured to be movable in a substantially horizontal direction perpendicular to the longitudinal axis, and wherein the second bunker section is configured to be movable under the first bunker section.

* * * * *